United States Patent
Harwood et al.

(10) Patent No.: US 8,040,973 B2
(45) Date of Patent: Oct. 18, 2011

(54) TRANSMITTER INCLUDING PRE-DISTORTION

(75) Inventors: Michael S. Harwood, Rushden (GB); Andre Szczepanek, Hartwell (GB); Derek Colman, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 741 days.

(21) Appl. No.: 12/028,461

(22) Filed: Feb. 8, 2008

(65) Prior Publication Data

US 2008/0192860 A1    Aug. 14, 2008

Related U.S. Application Data

(60) Provisional application No. 61/016,902, filed on Dec. 27, 2007.

(30) Foreign Application Priority Data

Feb. 9, 2007    (GB) .................................. 0702627.1

(51) Int. Cl.
*H04K 1/02* (2006.01)
(52) U.S. Cl. ........ 375/296; 375/229; 375/233; 375/234; 398/193; 455/114.3

(58) Field of Classification Search ........................ None
See application file for complete search history.

(56) References Cited

U.S. PATENT DOCUMENTS 6,680,681 B1 * 1/2004 Hsu et al. ...................... 341/144

OTHER PUBLICATIONS

Lin, Lei, et al.; Implementing a Digitally Synthesized Adaptive Pre-Emphasis Algorithm for use in a High-Speed Backplane Interconnection; Canadian Conf. on Electrical and Computer Engineering, 2004, Niagra Falls, Ont., Canada May 2-5, 2004; pp. 1221-1224.

* cited by examiner

*Primary Examiner* — Dac Ha
*Assistant Examiner* — Adolf Dsouza
(74) *Attorney, Agent, or Firm* — Dawn V. Stephens; W. James Brady; Frederick J. Telecky, Jr.

(57) ABSTRACT

The present invention relates to pre-distortion in transmitter circuits and provides a circuit for introducing pre-distortion into the output of a transmitter, wherein said pre-distortion comprises a pre-cursor, a cursor and a post-cursor, the circuit comprising: a first driver arranged to switch an output drive between said pre-cursor and said cursor; a second driver arranged to switch an output drive between said post-cursor and said cursor; a third driver arranged to switch an output drive between a positive cursor drive and a negative cursor drive. The arrangement provided give flexibility when setting the pre-cursor, cursor and post-cursor levels.

7 Claims, 8 Drawing Sheets

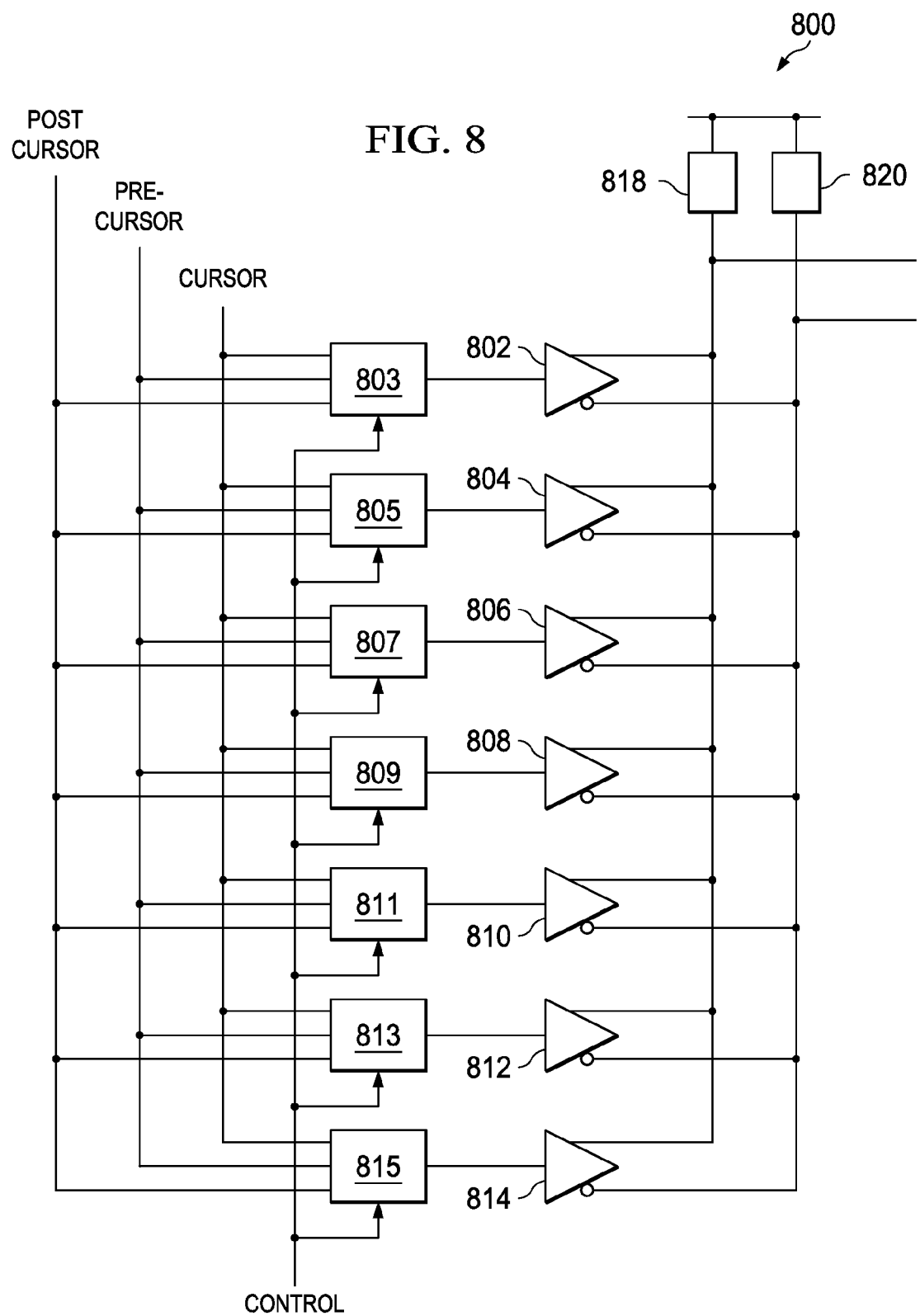

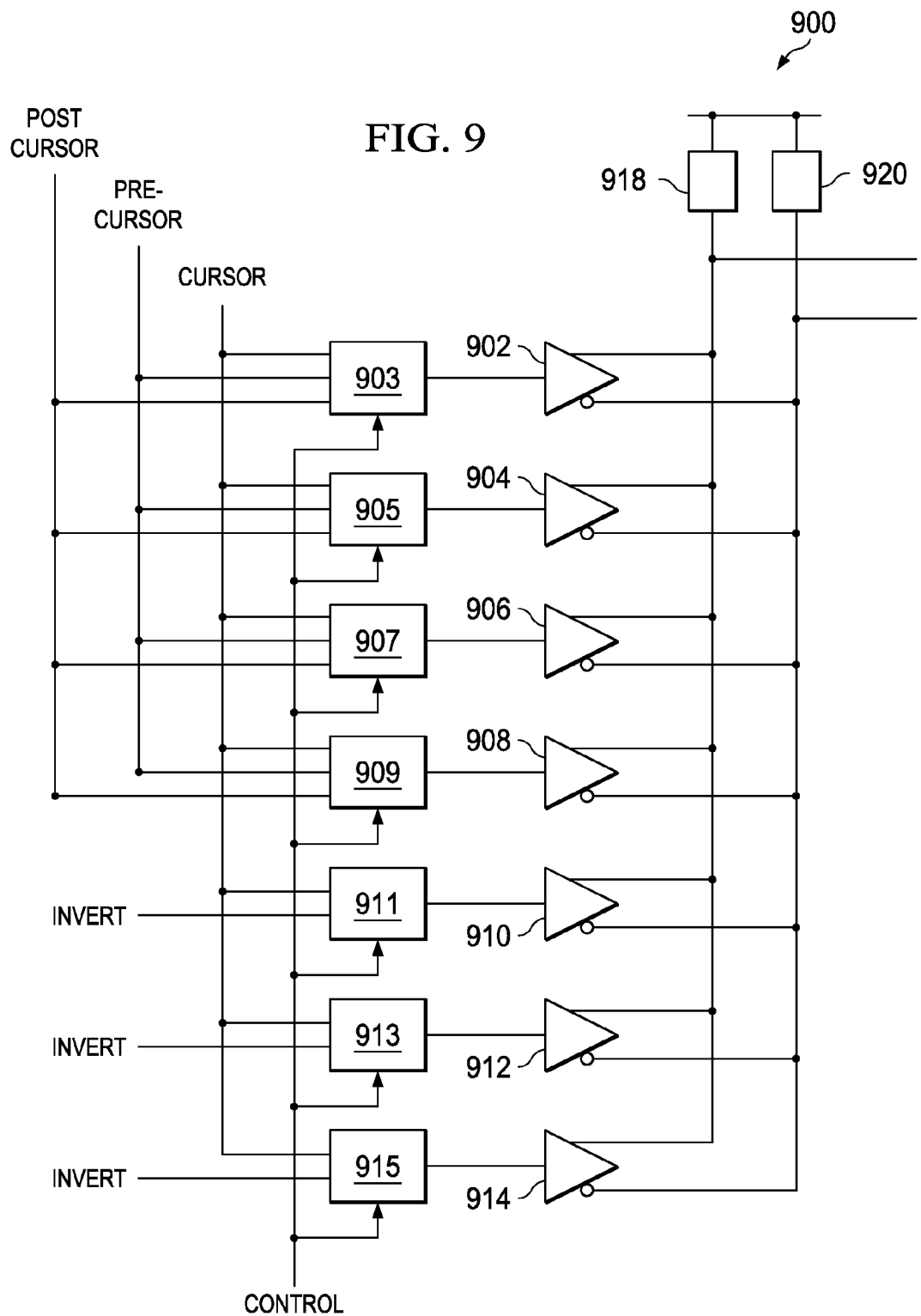

TRANSMITTER INCLUDING PRE-DISTORTION

This application claims priority under 35 U.S.C. 119(a) to GB Provisional Application No. 0702627.1 filed Feb. 9, 2007.

This application claims priority under 35 U.S.C. 119(e)(1) to U.S. Provisional Application No. 61/016,902 filed Dec. 27, 2007.

BACKGROUND OF THE INVENTION

The present invention relates to pre-distortion in transmitter circuits. In particular, the invention relates to the use and control of pre-cursor, cursor and post-cursor signals in a high data rate transmitter.

High speed data transfer between semiconductor devices in an electronic system may be achieved by the use of a serialiser/deserialiser (SerDes). In order to avoid the use of a plurality of parallel connections between devices, a single differential analogue path is used running at a high data rate. One exemplary arrangement is specified by IEEE 802.3/AE/P.

It is well known to provide pre-distortion to signals for transmission in an attempt to cancel out the distortion that will be introduced into the signal by the transmission channel.

By way of example, FIG. 6a shows a simple square wave that it to be transmitted over a channel. FIG. 6b shows that signal after is has been subjected to pre-distortion in an attempt to compensate for the impact of the channel on the signal.

The signal in FIG. 6b includes a negative pre-cursor element (indicated by the reference numeral 600), a large cursor element (indicated by the reference numeral 602) and a post cursor element (indicated by the reference numeral 604) between the level of the pre-cursor and the cursor. As shown in FIG. 6b, the pre-cursor element 600 is transmitted before the cursor element and the post-cursor element 604 is transmitted after the cursor element.

SUMMARY OF THE INVENTION

The present invention provides a circuit for introducing pre-distortion into the output of a transmitter, wherein said pre-distortion comprises a pre-cursor, a cursor and a post-cursor, the circuit comprising: a first driver arranged to switch an output drive between said pre-cursor and said cursor; a second driver arranged to switch an output drive between said post-cursor and said cursor; a third driver arranged to switch an output drive between a positive cursor drive and a negative cursor drive. The switching arrangements provided give complete flexibility when setting the pre-cursor, cursor and post-cursor levels. In one embodiment of the invention, the first output driving means is able to switch drive capability to any one of said pre-cursor, cursor and post-cursor output.

The present invention also provides a circuit for introducing pre-distortion into the output of a transmitter, wherein said pre-distortion comprises a pre-cursor, a cursor and a post-cursor, the circuit comprising: one of more first output driving means each able to switch drive capability from two or more of said pre-cursor, said cursor and said post-cursor in dependence on a control signal; one or more cursor output drivers, each able to switch a cursor drive capability between a positive drive and a negative drive in dependence on a control signal. The switching arrangements provided give flexibility when setting the pre-cursor, cursor and post-cursor levels.

The present invention further provides a method of adjusting pre-distortion in a transmitter system, wherein said pre-distortion comprises a pre-cursor, a cursor and a post-cursor, the method comprising the steps of:
 adjusting the pre-cursor as required, with an opposite adjustment being made to the cursor;
 adjusting the post-cursor as required, with an opposite adjustment being made to the cursor;
 adjusting the cursor as required in order to:
 compensate for the adjustments made to the curser as a result of any adjustments made to the pre-cursor and the post-cursor; and
 to make any desired adjustment to the cursor.

Thus, the method of the present invention allows the pre- and post-cursors to be set to whatever levels are required. As a result, the cursor will be sent to a particular level. The cursor can then be adjusted in order to set the cursor at the desired level. In this way, the method enables complete freedom in setting the pre-cursor, cursor and post-cursor levels.

In the use of the present invention, the pre-cursor is transmitted before the cursor, which, in turn, is transmitted before the post-cursor.

In one form of the invention, the first driver has a first input for receiving a signal indicative of the drive output to be provided to said pre-cursor and a second input for receiving a signal indicative of the drive output to be provided by said first driver to said cursor. The first driver may have a pre-determined drive capability such that the switching arrangement allocates that fixed drive resource.

In one form of the invention, the second driver has a first input for receiving a signal indicative of the drive output to be provided to said post-cursor and a second input for receiving a signal indicative of the drive output to be provided by said second driver to said cursor. The second driver may have a pre-determined drive capability such that the switching arrangement allocates that fixed drive resource.

In one form of the invention, the third driver has a first input for receiving a signal indicative of the magnitude of the drive output to be provided by said third driver to said cursor and a second input for receiving a signal indicative of the sign of the drive output to be provided by said third driver to said cursor. In an alternative arrangement, the third driver has first and second inputs, wherein the drive output provided by said third driver to said cursor is dependent on the value of a signal received at said first input minus a signal received at said second input. In either arrangement, the third driver may have a pre-determined drive capability such that the switching arrangement allocates that fixed drive resource.

A fourth driver may be provided that is arranged to switch an output drive between first and second post-cursors on the one hand and the cursor on the other hand, the fourth driver having a first input for receiving a signal indicative of the magnitude of the drive output to be provided by said fourth driver to both said first and second post-cursors and a second input for receiving a signal indicative of the drive output to be provided by the fourth driver to said cursor.

Each of said first output driving means may provide the same magnitude of drive capability to the selected drive output.

In one form of the invention, each of said cursor output drivers are half-power drivers. In this form of the invention, the cursor signals have half the output level of the pre- and post-cursor signals. In some arrangements of the invention, the cursor signal provided by a particular driver is either positive or negative. If the drive level is half that of the other driver circuits, then changing the cursor drive from, say a positive half unit to a negative half unit (or vice-versa) results in a total change of cursor level of one unit. This one unit can therefore be used to compensate for changes to the cursor level elsewhere in the circuit.

In one method in accordance with the invention, the post-cursors are adjusted as follows: adjust the first post-cursor as required, with an opposite adjustment being made to the cursor; and adjust the second post-cursor as required, with an opposite adjustment being made to the cursor.

In an alternative method of invention, the post-cursors are adjusted as follows: and adjust the first and second post-cursor in order to set the second post-cursor to a required level, with an opposite adjustment being made to the cursor; and adjust the first post-cursor as required, with an opposite adjustment being made to the cursor. In this arrangement, the second post-cursor is set to a desired level, which adjustment is also applied to the first post-cursor. The first post-cursor can then be adjusted independent of the second post-cursor in order to set the first post-cursor at a desired level.

The methods and circuits of the present invention may be used in an implementation of a SerDes data transfer system of the form described herein.

BRIEF DESCRIPTION OF THE DRAWINGS

Examples of the invention will now be described with reference to the accompanying drawings, of which:

FIG. 8 shows a second exemplary pre-distortion arrangement;

FIG. 9 shows a pre-distortion arrangement in accordance with a first aspect of the invention.

DETAILED DESCRIPTION OF THE PREFERRED EMBODIMENTS

A key challenge facing designers of high-bandwidth systems such as data-routers and super-computers is the requirement to transfer large amounts of data between ICs—either on the same circuit board or between boards. This data transmission application is called Serialisation-Deserialisation or "SerDes" for short. The present invention is useful in SerDes circuit and indeed was developed for that application. Nonetheless the invention may be used in other applications.

Analysis of typical backplane channel attenuation (which is around −24 dB) and package losses (−1 to −2 dB) in the presence of crosstalk predict that an un-equalized transceiver provides inadequate performance and that decision feedback equalization (DFE) is needed to achieve error rates of less than $10^{-17}$.

Traditional decision-feedback equalization (DFE) methods for SerDes receivers rely on either modifying, in analogue, the input signal based on the data history ["A 6.25 Gb/s Binary Adaptive DFE with First Post-Cursor tap Cancellation for Serial backplane Communications" R Payne et al *ISSCC* 2005; "A 6.4 Gb/s CMOS SerDes Core with feed-forward and Decision Feedback Equalization" M. Sorna et al *ISSCC* 2005; "A 4.8-6.4 Gb/s serial Link for Backplane Applications Using Decision Feedback Equalization" Balan et al *IEEE JSSC November* 2005.] or on having an adaptive analogue slicing level ["Techniques for High-Speed implementation of Non-linear cancellation" S.Kasturia *IEEE Journal on selected areas in Communications. June* 1991.] (i.e. the signal level at which the circuit decides whether the signal represents a 1 or a 0).

Figure 1:
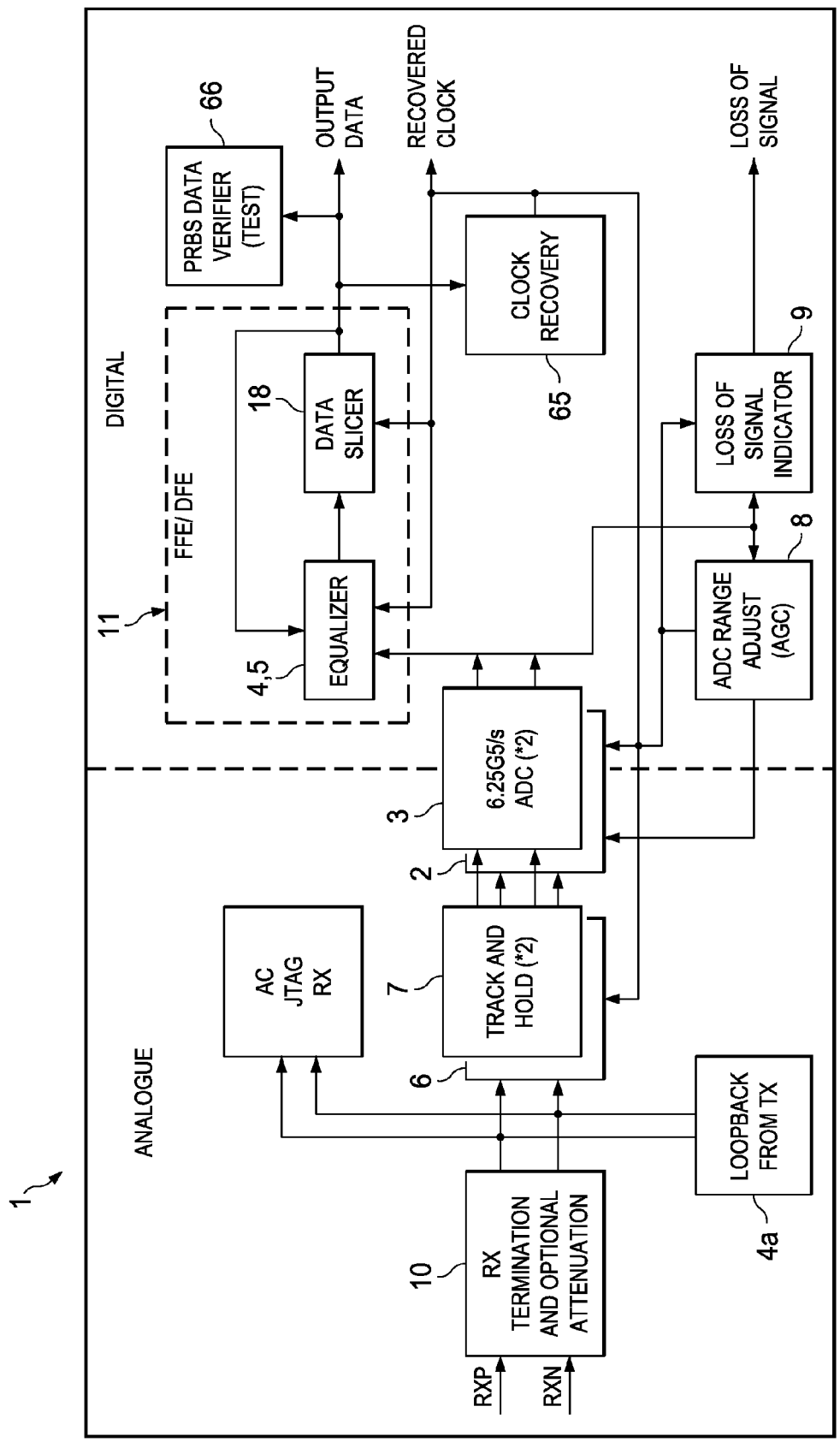
FIG. 1 is a block diagram of a receiver circuit, with which the transmitter of the present invention invention may be used.

A block diagram of a SerDes receiver circuit 1, which forms part of an integrated circuit, in which the present invention may be used is shown in FIG. 1. The invention may nonetheless be used in other applications.

In the receiver circuit 1 of FIG. 1 the input data is sampled at the baud-rate, digitized and the equalization and clock & data recovery (CDR) performed using numerical digital processing techniques. This approach results in the superior power/area scaling with process of digital circuitry compared to that of analogue, simplifies production testing, allows straightforward integration of a feed-forward equalizer and provides a flexible design with a configurable number of filter taps in the decision feedback equaliser. The circuit has been implemented in 65 nm CMOS, operating at a rate of 12.5 Gb/s.

The receiver circuit 1 comprises two baud-rate sampling ADCs (analogue to digital converters) 2 and 3, a digital 2-tap FFE (feed forward equaliser) 4 and digital 5-tap DFE (decision feedback equaliser) 5 to correct channel impairments.

The SerDes section of the integrated circuit, which includes the receiver circuit 1 is also provided with a transmitter 40 (FIG. 4), connected to transmit data over a parallel channel to that which the receiver circuit 1 is connected to receive data. The transmitter 40 comprises a 4-tap FIR filter to pre-compensate for channel impairments. In many applications the integrated circuit transmitting data to the receiver circuit 1 uses pre-compensation and in particular a similar transmitter circuit 40, but in other applications the receiver circuit 1 works without pre-compensation being used at the other end The receiver 1 of FIG. 1 is now described in more detail. The received data is digitized at the baud-rate, typically 1.0 to 12.5 Gb/s, using a pair of interleaved track and hold stages (T/H) 6 and 7 and a respective pair of 23 level (4.5 bit) full-flash ADCs 2 and 3 (i.e. they sample and convert alternate bits of the received analogue data waveform). The two track & hold circuits enable interleaving of the half-rate ADCs and reduce signal related aperture timing errors. The two ADCs, each running at 6.25 Gb/s for 12.5 Gb/s incoming data rate provide baud-rate quantization of the received data. The ADC's dynamic range is normalized to the full input amplitude using a 7-bit automatic gain control (AGC) circuit 8. A loss of signal indication is provided by loss of signal unit 9 that detects when the gain control signal provided by the AGC is out-of-range. An optional attenuator is included in the termination block 10, which receives the signals from the transmission channel, to enable reception of large signals whilst minimizing signal overload.

Figure 2:
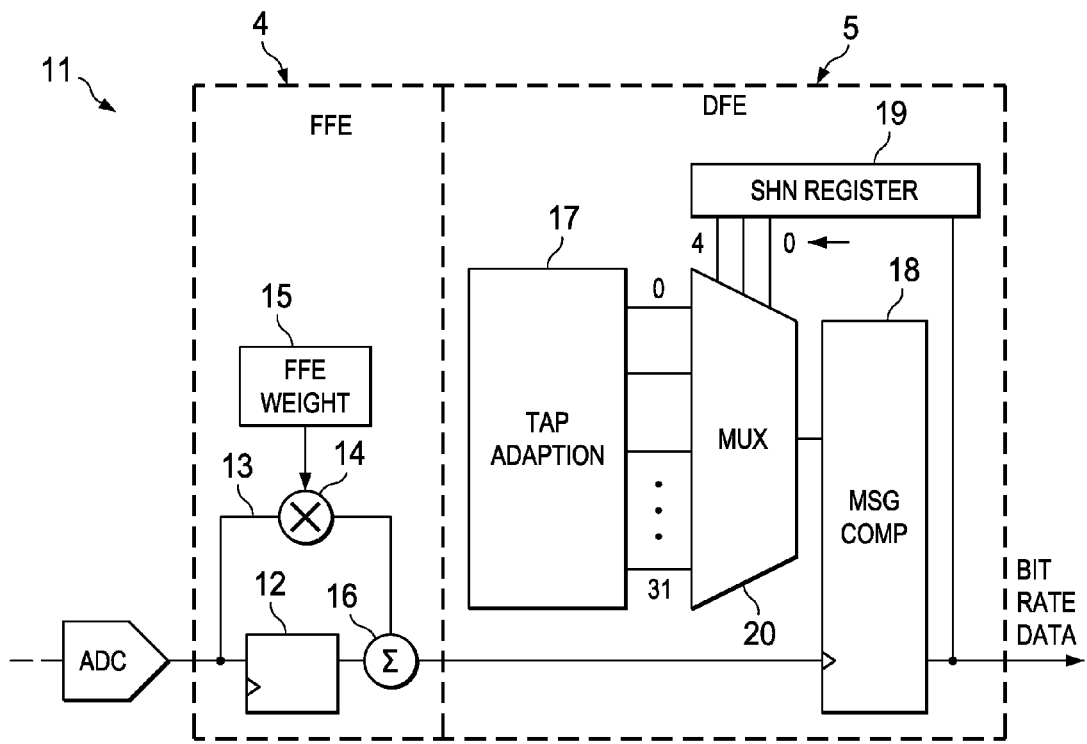
FIG. 2 shows the feed forward equaliser and the decision feedback equaliser of the receiver circuit of FIG. 1.

The digital samples output from the ADCs 2 and 3 are interleaved and the resulting stream of samples is fed into a custom digital signal processing (DSP) data-path that performs the numerical feed-forward equalization and decision-feedback equalization. This is shown in FIG. 2. This comprises a 1 UI delay register 12 connected to receive the stream of samples from the ADCs 2 and 3. (1 UI is a period of the clock, i.e. the delay between bits.) A tap 13 also feeds the samples from the ADCs to a multiplier 14, each sample being received by the delay latch 12 and the multiplier 14 at the same time. The multiplier 14 multiplies each sample by a constant weight value (held in a programmable register 15), which value is typically 10%. The outputs of the multiplier 14 and the delay register 12 are added together by an adder 16 to provide the output of the FFE 4.

The digital FFE/DFE is implemented using standard 65 nm library gates.

An advantage of applying the equalization digitally is that it is straightforward to include feed-forward equalization as a delay-and-add function without any noise-sensitive analogue delay elements. The FFE tap weight is selected before use to compensate for pre-cursor ISI and can be bypassed to reduce latency. Whilst many standards require pre-cursor de-emphasis at the transmitter, inclusion at the receiver allows improved bit error rate (BER) performance with existing legacy transmitters.

The DFE 5 uses an unrolled non-linear cancellation method ["Techniques for High-Speed implementation of Non-linear cancellation" S.Kasturia *IEEE Journal on selected areas in Communications. June* 1991]. The data output (i.e. the 1s and 0s originally transmitted) is the result of a magnitude comparison between the output of the FFE 4 and a slicer-level dynamically selected from a set stored in a set 17 of pre-programmed registers. The values are determined by a control circuit (not shown in FIG. 1) from the waveforms of test patterns sent during a setup phase of operation. The magnitude comparison is performed by a magnitude comparator 18 connected to receive the output of the FFE 4 and the selected slicer-level; it outputs a 1 if the former is higher than the latter and a 0 if it is lower or equal, thereby forming the output of the DFE 5.

The slicer-level is selected from one of 2n possible options depending on the previous n bits of data history. The history of the bits produced by the magnitude comparator 18 is recorded by a shift register 19 which is connected to shift them in. The parallel output of the shift register is connected to the select input of a multiplexer 20 whose data inputs are connected to the outputs of respective ones of the set 17 of registers holding the possible slicer-levels.

Unrolled tap adaption is performed using a least mean square (LMS) method where the optimum slicing level is defined to be the average of the two possible symbol amplitudes (+/−1) when proceeded by identical history bits. (For symmetry the symbols on the channel for the bit values 1 and 0 are given the values +1 and −1).

Although 5-taps of DFE were chosen for this implementation, this parameter is easily scaleable and performance can be traded-off against power consumption and die area. In addition, the digital equalizer is testable using standard ATPG (automatic test pattern generation) and circular built-in-self-test approaches.

Figure 3:
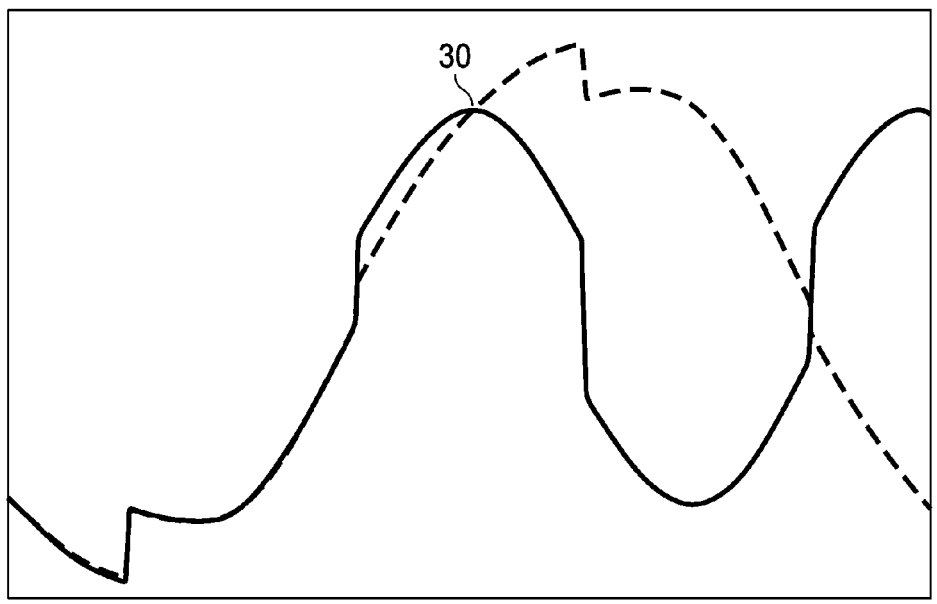
FIG. 3 is a graph showing the post equalised signal amplitude for exemplary bit patterns.

The chosen clock recovery approach uses a Muller-Mueller approach ["Timing recovery in Digital Synchronous Data Receivers" Mueller and Muller *IEEE Transactions on Communications May* 1976.] where the timing function adapts the T/H sample position to the point where the calculated pre-cursor inter-symbol interference (ISI) or h(−1) is zero, an example being given in FIG. 3. The two curves show the post-equalized response for 010 and 011 data sequences respectively. The intersection 30 at 3440 ps occurs when the sample of the second bit is independent of the third bit—that is, h(−1)=0. This position can be detected by comparing the post-equalized symbol amplitude with the theoretical amplitude h(0) and using the difference to update the CDR's phase-interpolator.

Figure 4:
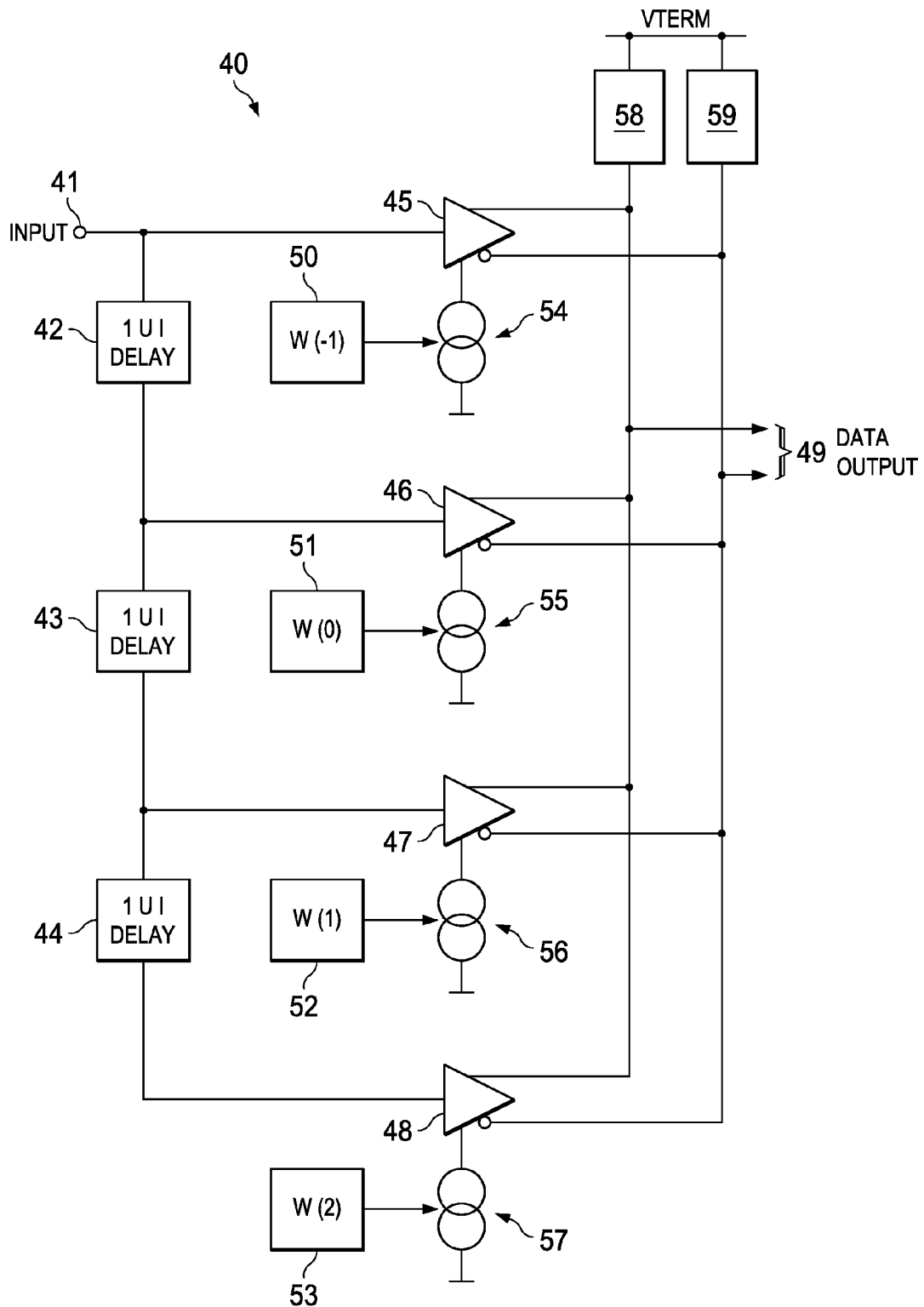
FIG. 4 is a diagram of a transmitter, in which the invention may be used.

A block diagram of the transmitter is shown in FIG. 4, which is implemented using CML techniques. The data to be transmitted (received at terminal 41) is sequentially delayed by three 1 UI delay registers 42, 43 and 44 connected in series. They produce, via the four taps before and after each delay, a nibble-wide word containing the pre-cursor, cursor and two post-cursor components. In fact to ease timing closure the data is sent to the transmitter from the digital part of the circuit that supplies the data in blocks of 4 nibbles (16 bits in parallel), the blocks being sent at a rate of 3.125/s. Each nibble is a frame of four bits of the bitstream offset by one bit from the next so the nibbles overlap and represent the data redundantly. A multiplexer then selects one of the nibbles, switching between them at a rate of $12.5 \times 10^9$/s, and presents that in parallel to the four taps, thereby making the bitstream appear to advance along the taps.

A 4-tap FIR output waveform is obtained from simple current summing of the time-delayed contributions. This is done with differential amplifiers 45 to 48, each having its inputs connected to a respective one of the taps and having its differential output connected to a common differential output 49. Although shown as four differential amplifiers the circuit is implemented as one differential amplifier with four inputs, which minimizes return-loss. The relative amplitude of each contribution is weighted to allow the FIR coefficients to be optimized for a given circuit (e.g. a backplane) and minimize the overall residual ISI. The weights are determined empirically either for a typical example of a particular backplane or once a backplane is populated and are stored in registers 50 to 53. The weights respectively control the controllable driving current sources 54 to 57 of the differential amplifiers 45 to 48 to scale their output current accordingly. Respective pull-up resistors 58 and 59 are connected to the two terminals of the differential output 49.

A PLL is used to generate low-jitter reference clocks for the transmitter and receiver to meet standards["OIF-CEI-02.0—Common Electrical I/O (CEI)—Electrical and Jitter Interoperability agreements for 6 G+bps and 11 G+bps I/O". *Optical Internetworking Forum, February* 2005; "IEEE Draft 802.3ap/Draft 3.0—Amendment: Electrical Ethernet Operation over Electrical Backplanes" *IEEE July* 2006.]. Most integrated circuits will have more than one receiver 1 and the PLL is shared between them with each receiver having a phase interpolator to set the phase to that of incoming data.

The PLL uses a ring oscillator to produce four clock-phases at a quarter of the line data-rate. The lower speed clocks allow power efficient clock distribution using CMOS logic levels, but need duty-cycle and quadrature correction at the point of use. The 3.125 GHz clocks are frequency doubled (XOR function) to provide the 6.25 GHz clock for the T/H & ADC. The transmitter uses the four separate 3.125 GHz phases, but they require accurate alignment to meet jitter specifications of 0.15UI p-p R.J. and 0.15UI p-p D.J.

The system described has been fabricated using a 65 nm CMOS process and has been shown to provide error-free operation at 12.5 Gb/s over short channels (two 11 mm package traces, 30cm low-loss PCB and two connectors). A legacy channel with −24 dB of attenuation at 3.75 GHz supports error free operation at 7.5 Gb/s.

Figure 5A:
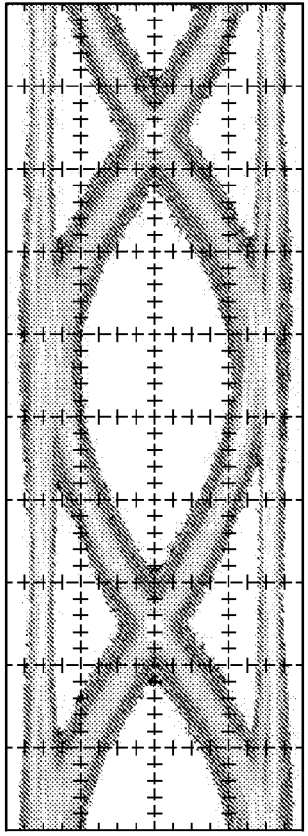
FIG. 5a shows the response of the receiver to a PRBS transmitted eye-pattern.
Figure 5B:
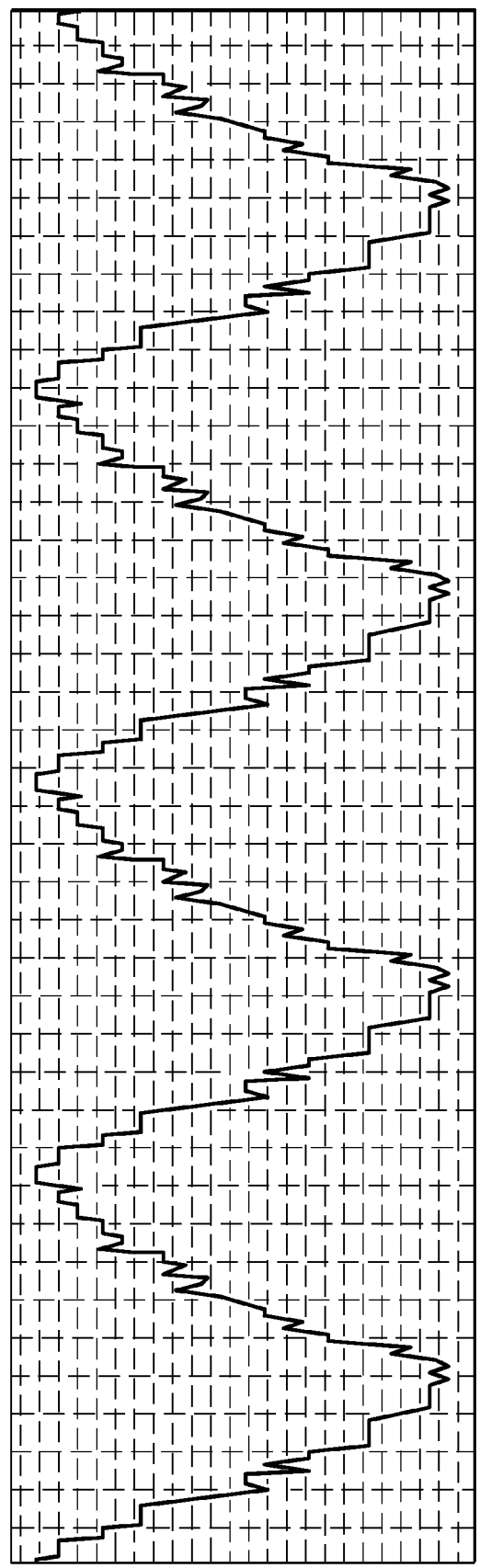
FIG. 5b shows the interleaved output of the ADCs of the receiver.
Figure 6A:
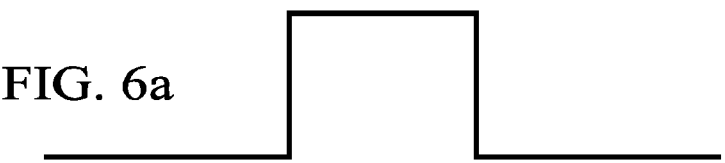
FIG. 6a is an exemplary waveform for transmission.
Figure 6B:
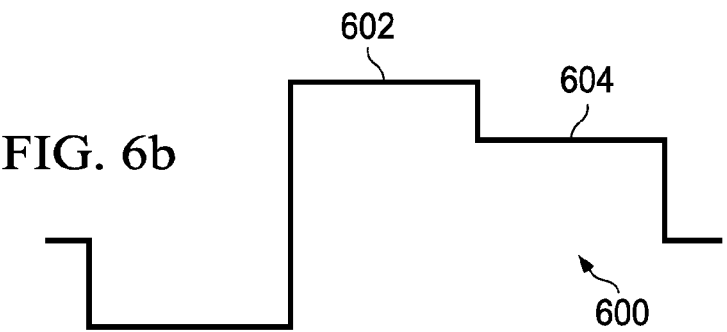
FIG. 6b shows the waveform of FIG. 6a after pre-distortion in accordance with an aspect of the present invention.

FIG. 5*a* shows a 12.5 Gb/s 27-1 pseudo random bit stream (PRBS) transmitted eye-pattern with 20% de-emphasis on the first post-cursor. The receiver includes, for test purposes, a PRBS data verifier 66, which confirms that the test pattern has been received. The differential peak-to-peak (pp) amplitude is 700 mV (200 mV/div). FIG. 5b shows the ADC output when a 6.25 GHz sine-wave is sampled and the phase between the sine-wave and receiver is incremented using a programmable delay-line. The measured codes are within +/−1 lsb (least significant bit) of the expected values. This level of performance ensures robust operation over a wide range of cables, green-field and legacy channels. The worst-case power of a single TX/RX pair, or "lane" is 330 mW and the total exemplary macro area is 0.45 mm² per lane (allowing for the PLL being shared by four TX/RX lanes.

As discussed above with reference to FIG. 4, one embodiment of the present invention provides a transmitter with a 4-tap FIR filter providing the pre-cursor, cursor and two post-cursor components. This arrangement distorts the signal for transmission in an attempt to compensate for distortions that are introduced by the transmission channel.

In order to provide effective pre-distortion, it is desirable to give a circuit designer the flexibility to change the weights of the pre-cursor, cursor and post-cursor independently of one another. However, many implementations of the arrangement of FIG. 4 do not provide this level of independence. For example, in some implementations, increasing one of the cursor, pre-cursor or post-cursor signals required a corresponding decrease to one of the other signals.

Figure 7:
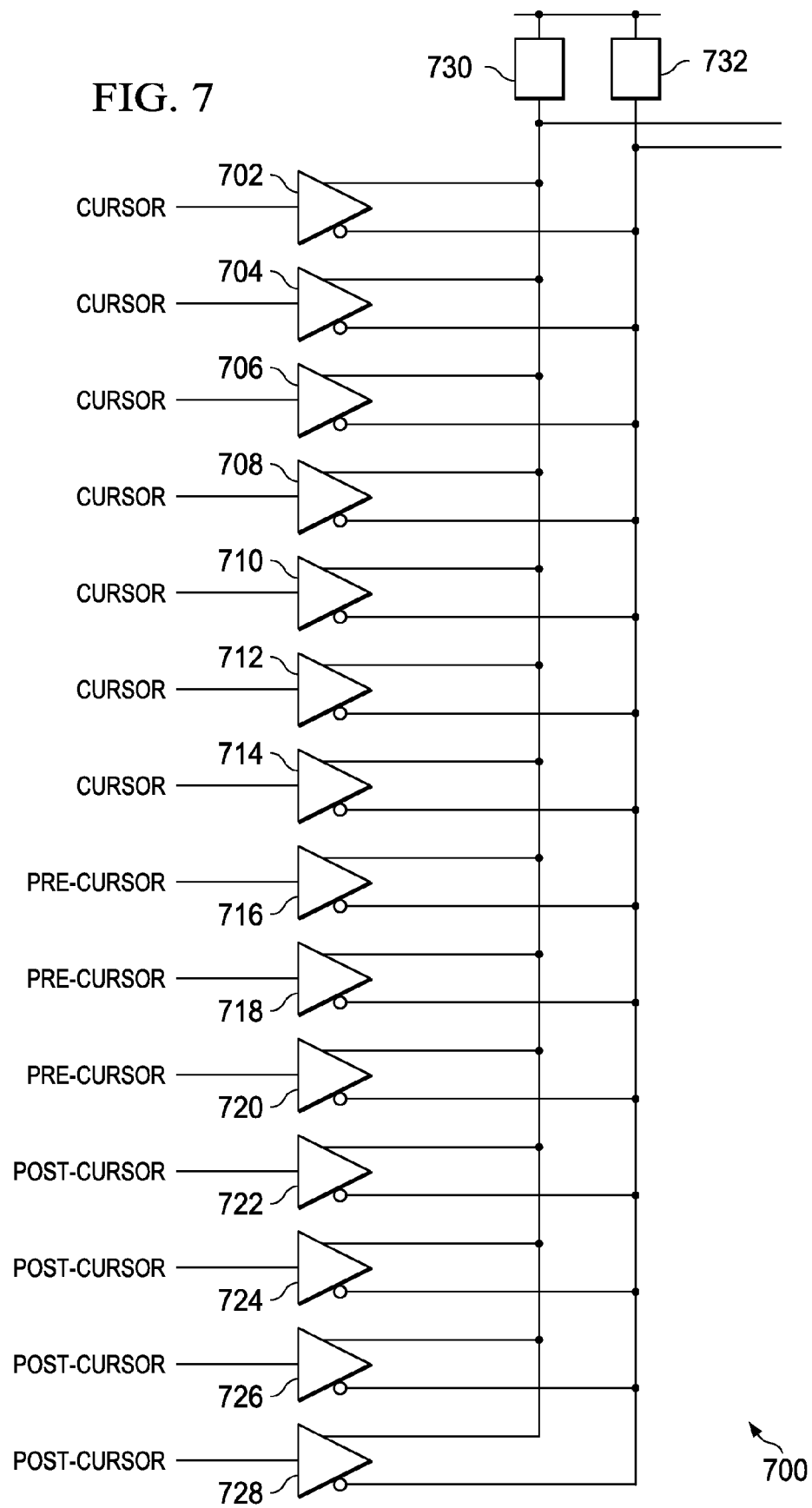
FIG. 7 shows an exemplary pre-distortion arrangement.

FIG. 7 is a schematic diagram, indicated generally by the reference numeral 700, of a simple implementation of a cursor system that aims to provide the desired independence. The circuit 700 comprises a plurality of driver elements 702, 704, 706, 708, 710, 712, 714, 716, 718, 720, 722, 724, 726 and 728.

Each driver element has a differential output connected to one of the differential outputs of the driver circuit 700. The said differential outputs are coupled to a positive power supply via pull-up resistors 730 and 732 respectively.

Of the driver elements, driver elements 702, 704, 706, 708, 710, 712 and 714 implement the desired cursor drive, elements 716, 718 and 720 implement the desired pre-cursor drive and elements 722, 724, 726 and 728 implement the desired post-cursor drive (in the arrangement of FIG. 7 there is only one post-cursor signal, there could, of course, be two post-cursor signals, as discussed above with reference to FIG. 4).

Each driver of said driver elements 702 to 728 can be individually controlled, for example via a switch (not shown) to provide the desired driver level. This provides complete independence, as the pre-cursor, cursor and post-cursor can each be set to any level up to a pre-determined maximum. However, the large number of driver elements in the circuit 700 results in a high capacitive load. This high capacitive load increases channel distortion, thereby adding to the problem that the circuit is intended to address. Accordingly, the arrangement of FIG. 7 is not effective.

FIG. 8 is a schematic diagram of a transmitter driver circuit 800. Transmitter driver 800 comprises driver elements 802, 804, 806, 808, 810, 812 and 814 and multiplexers 803, 805, 807, 809, 811, 813 and 815. Each multiplexer selects one of a post-cursor, pre-cursor and cursor signal received at its input as an output in dependence on a control signal CONTROL. The output of multiplexers 803, 805, 807, 809, 811, 813 and 815 are coupled to the inputs of driver elements 802, 804, 806, 808, 810, 812 and 814 respectively.

Each driver element has a differential output connected to one of the differential outputs of the driver circuit 800. The said differential outputs are coupled to a positive power supply via pull-up resistors 818 and 820 respectively.

Each of the driver elements 802, 804, 806, 808, 810, 812 and 814 can provide part of a pre-cursor signal, a cursor signal or a post-cursor signal under the control of the control signal. Thus, the circuit 800 has a great deal of flexibility.

Although extremely flexible, the circuit 800 does not provide independent pre-cursor, cursor and post-cursor control signals. The reason for this is that in order to increase any of the pre-cursor, cursor or post-cursor signals, one of the other signals must be reduced.

For example, assume that the driver circuits 802, 804, 806 and 808 provide a cursor signal, driver circuit 810 provides a pre-cursor signal and driver circuits 812 and 814 provide a post-cursor signal. Assume also that it is desired to increase the post-cursor signal by one unit. In order to do so, it would be necessary to decrease either the cursor drive signal or the pre-cursor drive signal by one unit.

FIG. 9 is a schematic diagram of a transmitter driver circuit in accordance with an embodiment of the present invention. The driver, indicated generally by the reference numeral 900, comprises driver elements 902, 904, 906, 908, 910, 912 and 914 and control circuits 903, 905, 907, 909, 911, 913 and 915. The inputs of driver elements 902, 904, 906, 908, 910, 912 and 914 are coupled to the outputs of control circuits 903, 905, 907, 909, 911, 913 and 915 respectively.

Each driver element has a differential output connected to one of the differential outputs of the driver circuit. The said differential outputs are coupled to a power rail (either the positive supply rail $V_{dd}$ or the negative supply rail $V_{ss}$) via resistors 918 and 920 respectively.

Each of control circuits 903, 905, 907 and 909 selects one of a post-cursor, pre-cursor and cursor signal received at its input as an output in dependence on a control signal CONTROL and controls the corresponding driver circuit accordingly.

Each of control circuits 911, 913 and 915 receives a cursor signal and an inverse signal at its input and controls the driver circuits 910, 912 and 914 such that those driver circuit either output a drive signal cursor or its inverse. Further, each of said drive circuits 910, 912 and 914 is a half power drive circuit such that each of those drive circuit provides either a drive equal to either:

cursor/2 or

−cursor/2

The circuit 900 works as follows. Assume that the driver 902 is connected to the cursor signal, driver 904 is connected to the pre-cursor signal and drivers 906 and 908 are connected to the post-cursor signal. Assume also that all of the invert signals are inactive, such that the drivers 910, 912, 914 provide a cursor drive of 1.5 units between them. In this arrangement, the pre-cursor, cursor and post-cursor signals are as follows:

Pre-cursor=1
Cursor=2.5
Post-cursor=2.

Assume now that it is desired to decrease the post-cursor drive by one unit. This can readily be achieved by switching driver 908 to the cursor signal. This action increases the cursor drive by one unit. However, if the invert signal to driver 911 is made active, this has the effect of reducing the cursor drive by one unit, such that the overall signals are as follows:

Pre-cursor=1
Cursor=2.5
Post-cursor=1.

Thus, the circuit 900 allows the pre-cursor, cursor and post-cursor signals to be changed independently.

Figure 10:
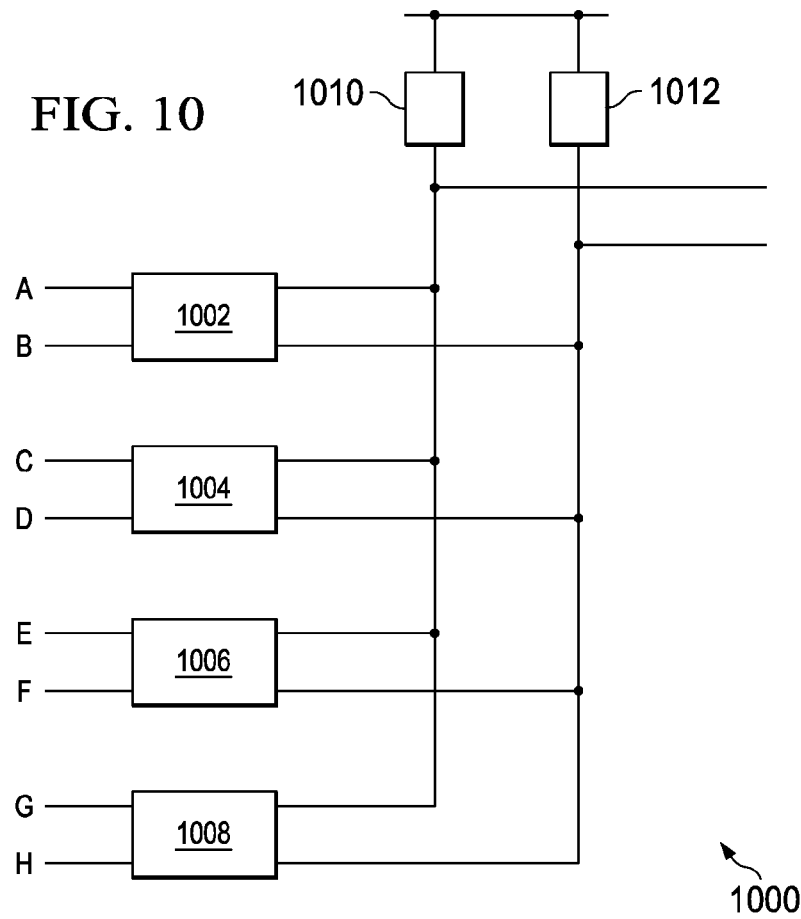
FIG. 10 shows a pre-distortion arrangement in accordance with a second aspect of the invention.

FIG. 10 shows a transmitter driver circuit, indicated generally by the reference numeral 1000, in accordance with an embodiment of the present invention.

The transmitter driver circuit 1000 comprises a first driver element 1002 receiving control signals A and B, a second driver element 1004 receiving control signals C and D, a third driver element 1006 receiving control signals E and F and a fourth driver element 1008 receiving control signals G and H. Each of driver elements 1002, 1004, 1006 and 1008 has a differential output connected to one of the differential outputs of the driver circuit 1000. The said differential outputs are coupled to a positive or negative power supply via pull-up resistors 1010 and 1012 respectively.

The transmitter driver 1000 sets the cursor, the pre-cursor (the bit that will be transmitted before the cursor), a first post-cursor (transmitted immediately after the cursor) and a second post-cursor (transmitted immediately after the first post-cursor) as follows.

The first driver element 1002 sets the level of the pre-cursor and provides part of the cursor in dependence on the control signals A and B. Specifically, the signal A provides a pre-cursor signal and the signal B provides a first cursor signal. The pre-cursor and cursor levels set by the driver element 1002 are achieved by switching the available drive between the pre-cursor and cursor output. Thus, if the driver element 1002 has 10 units of output drive available to it, those units can be divided between the pre-cursor and cursor in any combination: for example, all 10 units could be assigned to the pre-cursor, all 10 units could be assigned to the cursor, or the units could be split, such as 5 units to each of the pre-cursor and the cursor.

The second driver element 1004 provides part of the cursor in dependence on the control signals C and D. The drive capability of the second driver element 1004 can be divided between a positive maximum cursor drive and a negative maximum cursor drive. For example, the driver element 1004 may be able to provide a cursor drive of between −5 and +5. The second driver element 1004 therefore has a similar functionality to the driver elements 910, 912 and 914 described above with reference to FIG. 9.

The third driver element 1006 provides part of the first post-cursor and provides part of the cursor in dependence on the control signals E and F. Specifically, the signal E provides a post-cursor signal and the signal F provides a cursor signal. The post-cursor and cursor levels set by the driver element 1006 are achieved by switching the available drive between those outputs. Thus, if the driver element 1006 has 10 units of output drive available to it, those units can be divided between the post-cursor and cursor in any combination, in a similar manner to the driver element 1002 described above.

The fourth driver element 1008 provides part of the first post-cursor, the entire second post-cursor and part of the cursor in dependence on the control signals Post 1 & 2 and Cursor 3 in dependence on the control signals G and H. Specifically, the signal G provides a first and second post-cursor signal and the signal H provides a cursor signal. The fourth driver element provides the same drive level to post-cursor 1 and post-cursor 2 and the drive level can be switched between the post-cursors and the cursor. Thus, if the driver element 1006 has 10 units of output drive available to it, those units can be divided between the first and second post-cursors on the one hand, and the cursor on the other.

The circuit 1000 operates as follows. Assume that the circuit 1000 outputs the following drive levels:
Pre-cursor=−5
Cursor=20
First post-cursor=15
Second post-cursor=5.

Assume now that it is desired to increase the pre-cursor by 1 unit. This is achieved by adjusting driver element 1002 to increase the pre-cursor by one unit (at the expense of the cursor) and adjusting driver element 1004 to increase the cursor by one unit. This is achieved by increasing the control signal A by one unit, reducing control signal B by one unit and increasing control signal C by one unit.

Similarly, assume now that it is desired to decrease the first post-cursor by one unit. This is achieved by adjusting the driver element 1006 to increase the cursor by one unit (at the expense of the first post-cursor) and adjusting driver element 1004 to reduce the cursor by one unit. This is achieved by decreasing the control signal E by one unit, increasing the control signal F by one unit and reducing the control signal C by one unit.

Finally, assume that it is desired to increase the second post-cursor by two units and to increase the first post-cursor by one unit. The is achieved by adjusting the driver element 1008 to increase the first and second post-cursors by two units at the expense of the cursor (by increasing the control signal G by two units and reducing the control signal H by four units), adjusting the driver element 1006 to increase the cursor at the expense of the first post-cursor (by reducing the control signal E by one unit and increasing the control signal F by one unit), thereby resulting in an overall increase in the first post-cursor of one unit, and adjusting the driver element 1004 to increase the cursor by three units (by increasing the control signal C by three units).

This, in the circuit 1000, the pre-cursor, cursor and post cursor values are as follows:
Pre-cursor=A;
Cursor=B+/−C+F+H;
First post-cursor=E+G;
Second post-cursor=G In the example give above, a single control signal G is used as an input to the fourth driver element 1008 to control the first and second post-cursor. Of course, two control signals G1 and G2 could be used, with the first control signal G2 being used to control the first post-cursor output of the driver element 1008 and the second control signal G2 being used to control the second post-cursor output of the fourth driver element.

Thus, the circuit 1000 provides the required flexibility to adjust the pre-cursor, cursor, first post-cursor and second post-cursor independently of one another within pre-determined ranges.

The value for the cursor given above assumes that the magnitude output by the driver 1004 is set by the input C and the sign of the output is set by the input D. This is not essential. For example, the output could be switched in a similar manner to the drivers 1000, 1006 and 1008 such that if the driver has ten units of output available, and input of C=10 and D=0 provides an output of +5 unit, an input of C=5 and D=5 provides an output of 0 units and an input of C=0 and D=10 provides an output of −5 units. It should be noted that increasing C by one unit and reducing D by one unit results in overall change of the output driver of just one unit, i.e. the cursor driver is a half-power driver in a similar manner to the cursor drivers discussed above with reference to FIG. 9.

In one form of the invention, the driver elements 1002, 1004, 1006 and 1008 must have each of its driver elements used. Thus, if a driver element has 10 units available to it, those 10 units must be used.

What is claimed is:

1. A circuit for introducing pre-distortion into the output of a transmitter, wherein said pre-distortion comprises a pre-cursor, a cursor and a post-cursor, the circuit comprising:
 a first driver arranged to switch an output drive between said pre-cursor and said cursor;

a second driver arranged to switch an output drive between said post-cursor and said cursor, and a third driver arranged to switch an output drive between a positive cursor drive and a negative cursor drive, wherein said third driver has first and second inputs, wherein the drive output provided by said third driver to said cursor is dependent on the value of a signal received at said first input minus a signal received at said second input.

2. A circuit as claimed in claim 1, wherein said first driver has a first input for receiving a signal indicative of the drive output to be provided to said pre-cursor and a second input for receiving a signal indicative of the drive output to be provided by said first driver to said cursor.

3. A circuit as claimed in claim 1, wherein said second driver has a first input for receiving a signal indicative of the drive output to be provided to said post-cursor and a second input for receiving a signal indicative of the drive output to be provided by said second driver to said cursor.

4. A circuit as claimed in claim 1, wherein the pre-distortion further comprises a second post-cursor, the circuit further comprising a fourth driver arranged to switch an output drive between the first and second post-cursors on the one hand and the cursor on the other hand, the fourth driver having a first input for receiving a signal indicative of the magnitude of the drive output to be provided by said fourth driver to both said first and second post-cursors and a second input for receiving a signal indicative of the drive output to be provided by the fourth driver to said cursor.

5. A circuit as claimed in claim 1, wherein each of said third drivers is a half-power driver.

6. A method of adjusting pre-distortion in a transmitter system, wherein said pre-distortion comprises a pre-cursor, a cursor and a post-cursor, the method comprising the steps of:

adjusting the pre-cursor as required, with an opposite adjustment being made to the cursor;

adjusting the post-cursor as required, with an opposite adjustment being made to the cursor;

adjusting the cursor as required in order to:

compensate for the adjustments made to the curser as a result of any adjustments made to the pre-cursor and the post-cursor; and to make any desired adjustment to the cursor, wherein said post-cursor comprises a first post-cursor and a second post-cursor wherein the step of adjusting the post-cursor comprises the steps of:

adjusting the first post-cursor as required, with an opposite adjustment being made to the cursor; and adjusting the second post-cursor as required, with an opposite adjustment being made to the cursor.

7. A method as claimed in claim 6, wherein the step of adjusting the post-cursor comprises the steps of:

adjusting the first and second post-cursor in order to set the second post-cursor at a desired level, with an opposite adjustment being made to the cursor; and adjusting the first post-cursor as required, with an opposite adjustment being made to the cursor.

* * * * *